(12) United States Patent
Kaul et al.

(10) Patent No.: US 6,375,732 B1
(45) Date of Patent: Apr. 23, 2002

(54) PIGMENTS, THE PROCESS OF THEIR MANUFACTURING AND THEIR USE

(75) Inventors: Bansi Lal Kaul, Biel-Benken (CH); Bruno Piastra, Huningue; Valérie Wolf, Galfingue, both of (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/538,825

(22) Filed: Mar. 30, 2000

(30) Foreign Application Priority Data

Apr. 8, 1999 (GB) .............................................. 9907945
Sep. 23, 1999 (GB) ............................................ 9922413

(51) Int. Cl.$^7$ ............................................ C09B 67/22
(52) U.S. Cl. ...................... 106/494; 106/495; 106/496; 106/497; 106/498; 106/31.78; 424/63; 430/106; 524/92; 524/105
(58) Field of Search ................................ 106/493, 494, 106/498, 495, 496, 497, 31.78; 430/106; 424/63; 524/92, 105

(56) References Cited

U.S. PATENT DOCUMENTS

| 4,415,685 A | 11/1983 | Iqbal et al. ................... 524/92 |
| 4,579,949 A | 4/1986 | Rochat et al. ............... 546/167 |
| 4,783,540 A | 11/1988 | Bäbler ........................ 548/453 |
| 4,810,304 A | 3/1989 | Jaffe et al. ................... 106/494 |
| 5,264,032 A | 11/1993 | Dietz et al. .................. 106/411 |
| 5,476,949 A | 12/1995 | Wallquist et al. ............ 548/453 |
| 5,492,564 A | 2/1996 | Wooden et al. .............. 106/493 |
| 5,534,328 A | 7/1996 | Ashmead et al. ............ 428/166 |
| 5,693,824 A | 12/1997 | Mizuguchi et al. ......... 548/453 |
| 5,708,188 A | 1/1998 | Hao et al. .................... 548/453 |
| 5,811,062 A | 9/1998 | Wegeng et al. ............. 422/129 |
| 5,871,575 A | 2/1999 | Ruch et al. .................. 106/498 |
| 6,057,449 A | 5/2000 | Hendi ..................... 546/276.7 |

FOREIGN PATENT DOCUMENTS

| DE | 39 26 466 | 2/1991 |
| EP | 0 704 496 | 11/1999 |
| EP | 0 704 497 | 12/1999 |
| EP | 0 737 723 | 12/1999 |
| EP | 0 962 499 | 12/1999 |
| EP | 0 794 235 | 2/2000 |
| GB | 2 238 550 | 6/1991 |

OTHER PUBLICATIONS

Patent Abstract of DE 39 26 466 (Feb. 1991).
UK Search Report (Dec. 1999).

*Primary Examiner*—Anthony Green
(74) *Attorney, Agent, or Firm*—Susan S. Jackson; Scott E. Hanf

(57) ABSTRACT

Hybrid pigments of diketopyrrolo[3,4-c]pyrrole pigments and pigments bearing "acid" hydrogens like —NH, —OH or —CONH— groups, a process for the manufacturing of the hybrid diketopyrrolo[3,4-c]pyrrole pigments with pigments bearing "acid" hydrogens like —NH, — OH or —CONH— groups and their use as a pigment.

14 Claims, No Drawings

PIGMENTS, THE PROCESS OF THEIR MANUFACTURING AND THEIR USE

The present invention relates to new hybrid pigments of the class of diketopyrrolo [3,4-c]pyrrole (DPP) pigments, the process of their manufacturing and to their use as pigments.

BACKGROUND OF THE INVENTION

Diketopyrrolo[3,4-c]pyrrole (DPP) pigments are well known pigments. Known processes for preparing mixed crystals or solid solutions containing a DPP pigment as described e.g. in U.S. Pat. No. 4,783,540 include recrystallization in organic solvents, acid or alkaline precipitation and intensive milling of a mixture containing the corresponding pigment components.

SUMMARY OF THE INVENTION

Diketopyrrolo[3,4-c]pyrrole (DPP) pigments are formed by reacting a dialkyl succinate with nitriles in the presence of a strong base. An excess of base is required in order to get good yields. It has now been found that the diketopyrrolo [3,4-c]pyrrole pigment alkali salt suspension, formed during the synthesis, can be mixed with pigments bearing "acid" hydrogens like —NH, —OH or —CONH— groups, and is then able to form metal salts. The excess of base is used for the formation of the metal salt of the pigments bearing "acid" hydrogens like —NH, —OH or —CONH— groups. Thereafter, the mixture of metal salts is precipitated in water or a mixture of water and alcohol, optionally in the presence of additives known in the state of the art to control the particle size distribution. The hybrid pigments are formed thereby. The co-precipitation of the metal salts generates an advantageous interaction of crystals.

This process has the advantage that the final pigment composition is obtained with a fine particle size and doesn't need to be milled. With the hybrid pigments so obtained, it is possible to obtain highly advantageous shifts in shades, which are of great interest. Moreover, the hybrid pigments described in this invention, possess excellent dispersability, high color strength, high weatherability, high saturation and outstanding heat stability in engineering plastics. The pigmentary properties are better than the application properties of the individual components and/or their mechanical mixtures.

DESCRIPTION OF THE PREFERRED EMBODIMENTS

The invention provides in one of its aspects the new process for the preparation of hybrid pigments of diketopyrrolo[3,4-c]pyrrole pigments according to the formula (I)

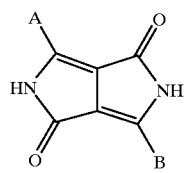

(I)

where A and B are each, independently of the other, a radical of the formula (II)

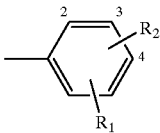

(II)

in which $R_1$ and $R_2$ are each, independently of the other, hydrogen, halogen, $C_1$–$C_5$ alkyl, nitrile or phenyl;

and of pigments bearing "acid" hydrogens like —NH, —OH or —CONH— groups of the class comprising diketopyrrolo[3,4-c]pyrrole, quinacridone, anthraquinone, benzimidazolone, naphthol AS, monoazo pigments, disazo pigments, disazo condensation pigments, isoindolinone, dioxazine, benzimidazolone triphenodioxazine, thiazine indigo, perinone, quinophthalone and metal complex pigments.

Such pigments bearing "acid" hydrogens like —NH, —OH or —CONH— groups preferably correspond to the formula (III) to (XI)

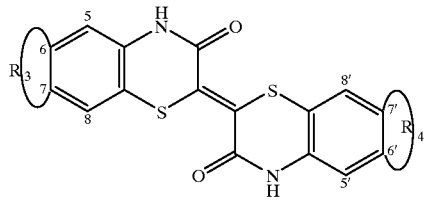

(III)

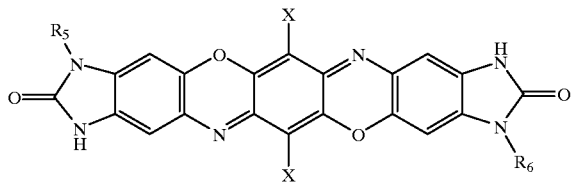

(IV)

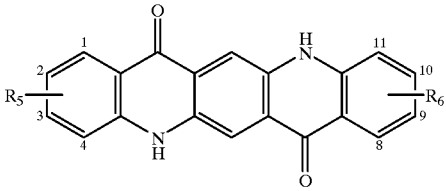

(V)

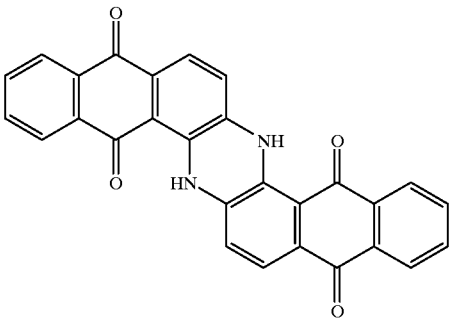

(VI)

(VII)

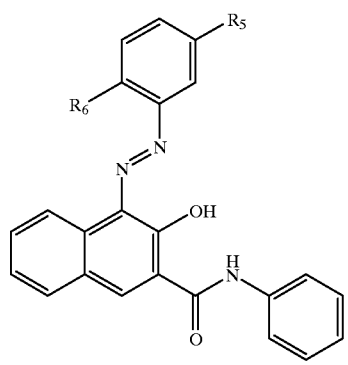

(VIII)

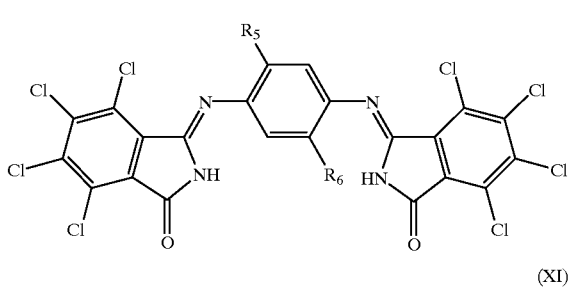

(IX)

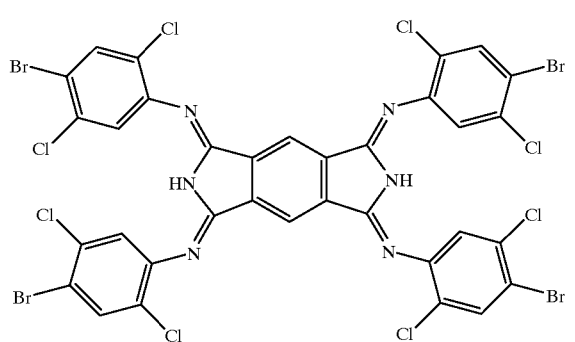

(X)

(XI)

in which $R_3$ and $R_4$ are independently the atoms necessary to complete the formation of a substituted or unsubstituted aromatic or aliphatic carbocyclic or heterocyclic ring system; $R_5$ and $R_6$ have the meaning of hydrogen, $C_{1-4}$alkyl or hylogen; $R_7$ and $R_8$ have the meaning of $C_{1-4}$alkoxy, nitro, $C_{1-4}$alkoxycarbonyl or phenylaminocarbonyl; and X has the meaning of hydrogen and chloro.

Preferably $R_3$ and $R_4$ are independently selected from the residues consisting of

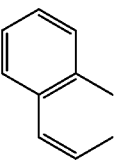 (a)

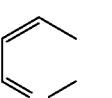 (b)

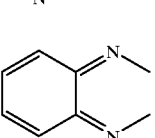 (c)

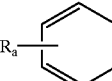 (d)

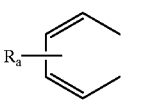 (e)

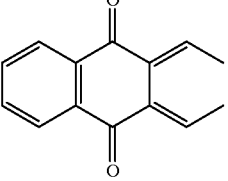 (f)

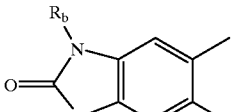 (g)

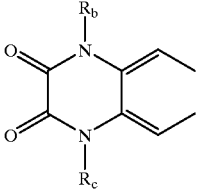

wherein $R_a$ is hydrogen, $C_{1-4}$ alkyl, halogen, $C_{1-4}$ alkoxy or trifluoromethyl; $R_b$ and $R_c$ are independently of each other, hydrogen or $C_{1-4}$alkyl especially methyl or ethyl, or aryl.

If $R_a$ has the meaning halogen, it can be F, Cl or Br, preferably Cl, and such substituent can be present more than once.

In formula (IV) $R_5$ and $R_6$ can also have the meaning of phenyl or substituted phenyl.

This process for the preparation of hybrid pigments consists in preparing thediketopyrrolo[3,4-c]pyrrole pigment alkali salt suspension with an excess of base, mixing it with a crude pigment bearing "acid" hydrogens like —NH, —OH or —CONH— groups and after the formation of the metal salt of the pigments bearing "acid" hydrogens like —NH, —OH or —CONH— groups, discharging the mixture of metal salts into water or a mixture of water and alcohol. The two pigment salts are precipitating together and the obtained product is isolated.

In a preferred method, the pigment salt suspension is prepared by mixing a diketopyrrolo[3,4-c]pyrrole pigment alkali salt suspension with a crude pigment bearing "acid" hydrogens like —NH, —OH or —CONH— groups, at a temperature in the order of 30 to 100° C., preferably from 50 to 95° C. The mixture is stirred, preferably at or below 95° C., until it is homogenous.

The hybrid pigment is then precipitated from the pigment metal salts suspension to form a pigment suspension by precipitation methods known in the art. For example, suitable precipitation methods include drowning into water or an alcohol, or adding an alcohol and/or water to the pigment salt suspension. The water and/or alcohol can be used in any desired mixing ratio between 5 and 20 parts by weight per 1 part of the pigment alkali metal salts formed. The presence of a mineral acid such as sulfuric acid or an organic acid, such as acetic acid, in the water and/or an alcohol is advantageous in such precipitation methods.

In a preferred method, the solvent used is an alcohol, in particular a secondary or tertiary alcohol. Preferred tertiary alcohols are tert-butanol and ter-amyl alcohol.

Suitable strong bases include alkali metals; such as lithium, sodium and potassium, and alkali metal alkoxides derived in particular from primary, secondary or tertiary aliphatic alcohols having 1 to 10 carbon atoms. It is also possible to use a mixture of the above mentioned alkali metal alkoxides. Preference is given to using alkali metal alkoxides, the alkali metal being especially sodium or potassium, and the alkoxide is preferably derived from a secondary or tertiary alcohol. A particularly preferred strong base is sodium teramylate. These alkali metal alkoxides can also be prepared in situ by reacting the corresponding alcohol with alkali metal.

In the process of the invention, the strong base can be used in an amount from 0,1 to 10 mol, preferably from 1,6 to 2,0 mol, based on 1 mole of the nitrile compound used as a starting compound for the pigments of formula (I) and corresponding to the formulae

A-CN           (XII)

and

B-CN           (XIII)

in which A and B are each as defined above and both compounds in the nitrile mixture are in molar ratio of 100:0 to 50:50 relative to each other.

The formation of the pigment alkali salts suspension can be carried out at a temperature from 60 to 140° C., preferably from 80 to 120° C.

Preferably, the obtained pigment salts suspension is drowned into water or an alcohol or an alcohol/water mixture. Suitable alcohols are methanol, ethanol, n-propanol, isopropylalcohol, ter-butanol and especially ter-amyl alcohol. The water and/or alcohol can be used in any desired mixing ratio between 5 and 20 parts by weight per 1 part of the pigment alkali metal salt formed. Water or ter-amyl alcohol/water mixtures are particularly suitable for drowning the pigment salts suspension.

One can also use additives known in the state-of-the-art to control the particle size of the pigment composition. It's possible as well to control the particle size of the pigment composition by heating under pressure the final pigment suspension at the end of the precipitation or the pigment salts suspension during the mixing step.

Depending on the pigments and on the drowning conditions, pigments with a particle size below 1.5 microns are obtained.

When the ripening of the hybrid pigment is complete, the conditioned pigment is isolated by filtration, with the press-cake being washed with water or an organic solvent, preferably methanol, followed by water and dried. Good results can be obtained by performing the filtration in acidic conditions.

Accordingly, the present invention relates to a process for preparing hybrid pigments comprising a diketopyrrolo[3,4-c]pyrrole pigment compound and a crude pigment bearing "acid" hydrogens like —NH, —OH or —CONH— groups which process comprises (a) preparing a pigment salt suspension by dissolving a crude pigment bearing "acid" hydrogens like —NH, —OH or —CONH— groups in a diketopyrrolo[3,4-c]pyrrole pigment alkali salt suspension (b) precipitation from the pigment salts suspension to form a hybrid pigment suspension; and (c) isolating the hybrid pigment.

The proportion of the diketopyrrolo[3,4-c]pyrrole pigment and the pigment bearing "acid" hydrogens like —NH, —OH or —CONH— groups in the hybrid pigment can vary between 10 and 90% by weight of the "other" pigment with 90 to 10% of diketopyrrolo[3,4-c]pyrrole pigment, in particular between 30 and 70% by weight of the "other" pigment with 70 to 30% of diketopyrrolo[3,4-c]pyrrole pigment, especially between 40 and 60% by weight of the "other" pigment with 60 to 40% of diketopyrrolo[3,4-c]pyrrole pigment.

It is also possible to form ternary hybrid pigments by mixing the diketopyrrolo[3,4-c]pyrrole pigment alkali salt suspension with two pigments bearing "acid" hydrogens like —NH, —OH or —CONH— groups.

A further aspect of the invention consists in providing new hybrid pigments of diketopyrrolo[3,4-c]pyrrole pigments according to formula (I) (as defined above) and of other pigments bearing "acid" hydrogens like —NH, —OH or —CONH— groups belonging to the class comprising anthraquinone, benzimidazolone, naphthol AS, monoazo and disazo pigments, disazo condensation pigments, isoindolinone, dioxazine, benzimidazolone triphenodioxazine, thiazine indigo, perinone, quinophthalone and metal complex pigments.

Preferred hybrid pigments according to the invention are those consisting of a diketopyrrolo[3,4-c]pyrrole pigment and of a pigment according to one of the formulae (III), (IV), (VI), (VII), (VIII), (IX), (X) and (XI) as defined above.

Especially preferred hybrid pigments are those consisting of a diketopyrrolo[3,4-c]pyrrole pigment according to formula (I) and a thiazine indigo pigment according to formula (III) or a benzimidazolone triphenodioxazine pigment according to formula (IV).

The hybrid pigments according to the invention are suitable for the mass pigmentation of suitable substrates including synthetic polymers, synthetic resins and regenerated fibers optionally in the presence of solvents. These substrates more particularly include oil or water and solvent based surface coatings, polyester spinning melts, polyethylene, polystyrene and polyvinyl chloride molding materials, rubber and synthetic leather. Furthermore, the pigments can be used in the manufacture of printing inks, for the mass coloration of paper and for coating and printing textiles.

The hybrid pigments according to the invention are also suitable as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics"; Springer Series in Electrophysics 14, Springer Verlag, $2^{nd}$ Edition, 1992).

Typical toner binders are addition polymerization, polyaddition and polycondensation resins, such as styrene, styrene-acrylate, styrene-butadiene, acrylate, polyester and phenol-epoxy resins, polysulphones, polyurethanes, individually or in combination, and also polyethylene and polypropylene, which may comprise further constituents, such as charge control agents, waxes or flow assistants, or may be modified subsequently with these additives.

The hybrid pigments according to the invention are suitable, furthermore, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins that are typically employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

In addition, the hybrid pigments formed by a process according to the invention are suitable as colorants in ink-jet inks, both aqueous and non-aqueous, and in those inks, which operate in accordance with the hot-melt process. The hybrid pigments are also suitable as colorants in cosmetic compositions.

When applied to the afore-mentioned substrates the co-pigments are found to be resistant to migration and fast to light, and show fastness to washing, chlorite, hypochlorite and peroxide bleaching, rubbing, overspraying and solvents. Notably, the pigments display high tinctorial power, good opacity and good heat stability.

Based on the polymeric material to be mass colored, the co-pigments according to the invention are used in amounts of 0.01 to 30% by weight, preferably of 0.1 to 10% by weight.

EXAMPLES

There now follows a series of examples which serves to illustrate the invention.

EXAMPLE 1

Co-synthesis of 3,6-di(4-chlorophenyl)-1,4-diketopyrrolo[3,4-c]pyrrole with trans-2,2'-bis(4H-1,4-benzothiazine)-indigo: 60/40 molar-percent A reactor of 1500 ml is charged with 400 ml of ter-amyl alcohol under nitrogen. 50 ml of teramyl alcohol are distilled off the reactor. 18.4 g (0.80 moles) of sodium are added and the mixture is heated to 95–102° C. The molten sodium is then maintained overnight at 100–105° C. with vigorous stirring. To the resulting solution are then added at 60° C., 62.5 g (0.44 moles) of 4-chlorobenzonitrile. Subsequently 58 g (0.286 moles) of diisopropyl succinate are metered in at 96° C. over 2 hours. The resulting isopropanol is distilled off at the same time. The reaction mixture is further stirred for 8 hours. 44.5 g (0.136 moles) of trans-2,2'-bis(4H-1,4-benzo-thiazine)-indigo are added at 80° C. The reaction mixture is further stirred at 95° C. for 2 hours. Then the reaction mixture at 95° C. is discharged onto 400 ml of water at 80° C. The resulting mixture is subsequently stirred at 80° C. for 1 hour. The ter-amyl alcohol is distilled off by a steam distillation over 2 hours. The resulting water suspension is filtered at 80° C. and the filter cake washed with 3.8 liters of hot water. The hybrid pigment is dried at 80° C. under vacuum before testing 117 g of a red powder is obtained. The red pigment composition so obtained shows excellent pigment properties like dispersibility, color strength, excellent heat and light stability when applied in engineering plastics or coatings.

EXAMPLE 2

Co-synthesis of 3,6-di(4-chlorophenyl)-1,4-diketopyrrolo[3,4-c]pyrrole with 7,7'-dichloro-trans-2,2'-bis(4H-4-benzothiazine)-indigo; 60/40 molar-percent A reactor of 1500 ml is charged with 400 ml of ter-amyl alcohol under nitrogen. 50 ml of teramyl alcohol are distilled off the reactor. 18.4 g (0.80 moles) of sodium are added and the mixture is heated to 95–102° C. The molten sodium is then maintained overnight at 100–105° C. with vigorous stirring. To the resulting solution are then added at 80° C., 62.5 g (0.44 moles) of 4-chlorobenzonitrile. Subsequently 58 g (0.286 moles) of diisopropyl succinate are metered in at 96° C. over 2 hours. The resulting isopropanol is distilled off at the same time. The reaction mixture is further stirred for 8 hours. 53.9 g (0.136 moles) of 7,7'-dichloro-trans-2,2'-bis(4H-1,4-benzothiazine)-indigo are added at 80° C. and the reaction mixture is additionally diluted with 70 ml of ter-amyl alcohol. The reaction mixture is further stirred at 95° C. for 2 hours. Then the reaction mixture at 95° C. is discharged onto 300 ml of water at 80° C. The resulting mixture is subsequently stirred at 80° C. for 1 hour. The ter-amyl alcohol is distilled off by a steam distillation over 2 hours. The resulting water suspension is filtered at 80° C. and the filter cake washed with 3 liters of hot water. The hybrid pigment is dried at 80° C. under vacuum before testing. 117.6 g of a red powder is obtained. The red pigment composition so obtained shows excellent pigment properties like dispersibility, color strength, excellent heat and light stability when applied in engineering plastics or coatings.

EXAMPLE 3

Co-synthesis of 3,6-di(4-chlorophenyl)-1,4-diketopyrrolo[3,4-c]pyrrole with trans-2,2'-bis(4H-1,4-benzothiazine)-indigo: 50/50 by weight A reactor of 1500 ml is charged with 400 ml of ter-amyl alcohol under nitrogen. 50 ml of ter-amyl alcohol are distilled off the reactor. 18.4 g (0.80 moles) of sodium are added and the mixture is heated to 95–102° C. The molten sodium is then maintained overnight at 100–105° C. with vigorous stirring. To the resulting solution are then added at 80° C., 62.5 g (0.44 moles) of 4-chlorobenzonitrile. Subsequently 58 g (0.286 moles) of diisopropyl succinate are metered in at 96° C. over 2 hours. The resulting isopropanol is distilled off at the same time. The reaction mixture is further stirred for 8 hours. 73.2 g (0.22 moles) of trans-2,2'-bis(4H-1,4-benzo-thiazine)-indigo are added at 80° C. and the reaction mixture is additionally diluted with 350 ml of t-amyl alcohol. The reaction mixture is further stirred at 95° C. for 2 hours. Then the reaction mixture at 95° C. is discharged onto 300 ml of water at 80° C. The resulting mixture is subsequently stirred at 80° C. for 1 hour. The ter-amyl alcohol is distilled off by a steam distillation over 2 hours. The resulting water suspension is filtered at 80° C. and the filter cake washed with 3.8 liters of hot water. The hybrid pigment is dried at 80° C. under vacuum before testing 122.4 g of a red powder is obtained.

EXAMPLES 4–65

Hybrid pigments of diketopyrrolo[3,4-c]pyrrole pigments (I), with pigments of the structures, according to formula (III), (IV), (V), (VI), (VII), (VIII), (IX), (X), (XI) are prepared according to the process described in the previous examples 1–3, adjusting the amount of pigment introduced in the beginning to reach the expected ratio between diketopyrrolo[3,4-c]pyrrole pigment and the crude pigment bearing "acid" hydrogen like —NH, —OH or —CONH— groups. They are listed in the following table.

| | Diketopyrrolo [3,4-c]pyrrole Pigment (I) | | pigment bearing "acid" hydrogens like —NH, —OH or —CONH groups | | | Ratio (molar | Hue |
|---|---|---|---|---|---|---|---|
| Ex. | $R_1$ | $R_2$ | $R_3$ | $R_4$ | X | percent) | in lacquers |
| | | | Structure III | | | | |
| 4 | 4-Cl | 4'-Cl | 7-Cl | 7'-Cl | — | 40/60 | Red |
| 5 | 4-Cl | 4'-Cl | 7-Cl | 7'-Cl | — | 50/50 | Red |
| 6 | 4-Cl | 4'-Cl | 7-Cl | 7'-Cl | — | 70/30 | Red |
| 7 | 4-Cl | 4'-Cl | 7-Cl | 7'-Cl | — | 80/20 | Red |
| 8 | 4-$CH_3$ | 4'-$CH_3$ | 7-Cl | 7'-Cl | — | 80/20 | Red |
| 9 | 4-$CH_3$ | 4'-$CH_3$ | 7-Cl | 7'-Cl | — | 50/50 | Red |
| 10 | 4-Cl | 4'-Cl | H | H | — | 50/50 | Red |
| 11 | 4-Cl | 4'-Cl | H | H | — | 70/30 | Red |
| 12 | 4-$CH_3$ | 4'-$CH_3$ | H | H | — | 20/80 | Orange |
| 13 | 4-$CH_3$ | 4'-$CH_3$ | H | H | — | 50/50 | Red |
| 14 | 4-Cl | 4'-Cl | 7-$CH_3$ | 7'-$CH_3$ | — | 80/20 | Red |
| 15 | 4-Cl | 4'-Cl | 7-$CH_3$ | 7'-$CH_3$ | — | 50/50 | Red |
| 16 | 4-$CH_3$ | 4'-$CH_3$ | 7-$CH_3$ | 7'-$CH_3$ | — | 80/20 | Orange |
| 17 | 4-terButyl | 4-terButyl | 7-$CH_3$ | 7'-$CH_3$ | — | 50/50 | Orange |
| | | | Structure IV | | | | |
| 18 | 4-Cl | 4'-Cl | $CH_3$ | $CH_3$ | Cl | 70/30 | Red violet |
| 19 | 4-Cl | 4'-Cl | $C_2H_5$ | $C_2H_5$ | Cl | 70/30 | Red violet |
| 20 | 4-Cl | 4'-Cl | $C_6H_5$ | $C_6H_5$ | H | 70/30 | Bluish red |
| 21 | 4-Cl | 4'-Cl | p-Cl—$C_6H_5$ | p-Cl—$C_6H_5$ | H | 70/30 | Bluish red |
| | | | Structure V | | | | |
| 22 | 4-Cl | 4'-Cl | H | H | — | 60/40 | Red |
| 23 | 4-Cl | 4'-Cl | H | H | — | 50/50 | Red |
| 24 | 4-Cl | 4'-Cl | 2-$CH_3$ | 9-$CH_3$ | — | 50/50 | Red |
| 25 | 4-Cl | 4'-Cl | 2-Cl | 9-Cl | — | 80/20 | Red |
| 26 | 4-$CH_3$ | 4'-$CH_3$ | H | H | — | 50/50 | Red |
| 27 | 4-$CH_3$ | 4'-$CH_3$ | 2-$CH_3$ | 9-$CH_3$ | — | 50/50 | Red |
| 28 | 4-$CH_3$ | 4'-$CH_3$ | 2-Cl | 9-Cl | — | 80/20 | Red |
| 29 | H | H | H | H | — | 50/50 | Red |
| 30 | H | H | 2-$CH_3$ | 9-$CH_3$ | — | 80/20 | Red |
| 31 | H | H | 2-Cl | 9-Cl | — | 80/20 | Red |
| | | | Structure VI | | | | |
| 32 | 4-Cl | 4'-Cl | — | — | — | 80/20 | Reddish blue |
| 33 | 4-Cl | 4'-Cl | — | — | — | 20/80 | Bluish red |
| 34 | 4-Cl | 4'-Cl | — | — | — | 50/50 | Reddish blue |
| 35 | H | H | — | — | — | 60/40 | Reddish blue |
| 36 | H | H | — | — | — | 40/60 | Reddish blue |
| 37 | 4-$CH_3$ | 4'-$CH_3$ | — | — | — | 60/40 | Reddish blue |
| 38 | 4-$CH_3$ | 4'-$CH_3$ | — | — | — | 40/60 | Bluish red |
| | | | Structure VII | | | | |
| 39 | 4-Cl | 4'-Cl | Cl | H | — | 60/40 | Red |
| 40 | 4-Cl | 4'-Cl | H | Cl | — | 50/50 | Red |
| 41 | H | H | Cl | H | — | 50/50 | Orange |
| 42 | H | H | H | Cl | — | 40/60 | Reddish orange |

-continued

| Ex. | Diketopyrrolo [3,4-c]pyrrole Pigment (I) R₁ | R₂ | pigment bearing "acid" hydrogens like —NH, —OH or —CONH groups R₃ | R₄ | X | Ratio (molar percent) | Hue in lacquers |
|---|---|---|---|---|---|---|---|
| 43 | 4-CH₃ | 4'-CH₃ | Cl | H | — | 60/40 | Reddish orange |
| 44 | 4-CH₃ | 4'-CH₃ | H | Cl | — | 50/50 | Red |
| | | | Structure VIII | | | | |
| 45 | 4-Cl | 4'-Cl | 3-COOCH₃ | 5-COOCH₃ | — | 60/40 | Orange |
| 46 | 4-Cl | 4'-Cl | 2-COOCH₃ | 5-COOCH₃ | — | 50/50 | Orange |
| 47 | 4-Cl | 4'-Cl | 2-NO₂ | 4-Cl | — | 50/50 | Orange |
| 48 | H | H | 3-COOCH₃ | 5-COOCH₃ | — | 60/40 | Orange |
| 49 | H | H | 2-COOCH₃ | 5-COOCH₃ | — | 80/20 | Orange |
| 50 | H | H | 2-NO₂ | 4-Cl | — | 50/50 | Orange |
| 51 | 4-CH₃ | 4'-CH₃ | 3-COOCH₃ | 5-COOCH₃ | — | 60/40 | Orange |
| 52 | 4-CH₃ | 4'-CH₃ | 2-COOCH₃ | 5-COOCH₃ | — | 80/20 | Orange |
| 53 | 4-CH₃ | 4'-CH₃ | 2-NO₂ | 4-Cl | — | 40/60 | Reddish orange |
| | | | Structure IX | | | | |
| 54 | 4-Cl | 4'-Cl | 2-COOCH₃ | H | — | 50/50 | Red |
| 55 | 4-Cl | 4'-Cl | 2-OCH₃ | 4-CONHC₆H₅ | — | 60/40 | Red |
| 56 | H | H | 2-COOCH₃ | H | — | 50/50 | Red |
| 57 | H | H | 2-OCH₃ | 4-CONHC₆H₅ | — | 60/40 | Red |
| 58 | 4-CH₃ | 4'-CH₃ | 2-COOCH₃ | H | — | 50/50 | Red |
| 59 | 4-CH₃ | 4'-CH₃ | 2-OCH₃ | 4-CONHC₆H₅ | — | 60/40 | Red |
| | | | Structure X | | | | |
| 60 | 4-Cl | 4'-Cl | H | — | — | 60/40 | Orange |
| 61 | H | H | H | — | — | 50/50 | Orange |
| 62 | 4-Cl | 4'-Cl | Cl | — | — | 30/70 | Orange |
| 63 | 4-Cl | 4'-Cl | — | — | — | 60/40 | Orange |
| 64 | H | H | — | — | — | 50/50 | Orange |
| 65 | 4-CH₃ | 4'-CH₃ | — | — | — | 30/70 | Orange |

APPLICATION IN PVC MASSTONE

The preparation of a 1% colored PVC sheet is performed as follows: 100 parts of clear PVC are mixed with 0.1 part of pigment (obtained according to Example 1) for 2 minutes. The mixture is passed between two rollers for 5 minutes, the front roller being heated at 130° C. and the rear roller being heated at 135° C. Then the sheet is pressed under a pressure of 25 tones between two chromium-plated steel plates heated at 165° C., for 5 minutes. The pressed sheet is colored with a red shade.

APPLICATION IN PVC WHITE

The preparation of a 0.1% colored PVC sheet is performed as follows: 100 parts of PVC-white (0.5% TiO₂) are mixed with 0.1 part of pigment for 2 minutes. The mixture is passed between two rollers for 8 minutes, the front roller being heated at 160° C. and the rear roller being heated at 165° C. Then the sheet is pressed under a pressure of 25 tones between two chromium-plated steel plates heated at 160° C., for 5 minutes.

APPLICATION IN LACQUERS MASSTONE

The preparation of the alkydmelamine (AM5) resin coating is performed as follows: 3.6 g of pigment, 26.4 g of clear AM5 (35%) and 85 g of glass beads are stirred in a Skandex stirrer for 30 minutes. 30 g of this preparation are mixed with 60 g of clear AM5 (55.8%). The dispersion is sprayed on a cardboard sheet, air-dried for 15 minutes and baked at 140° C. in an oven for 30 minutes.

APPLICATION IN LACQUERS WHITE

The preparation of the alkydmelamine (AM5) resin coating is performed as follows: 3.6 g of pigment, 26.4 parts of clear AM5 (35%) and 85 g of glass beads are stirred in a Skandex stirrer for 30 minutes. 7.5 g p of this preparation are mixed with 20 g of AM5-white (30% TiO₂). The dispersion is sprayed on a cardboard sheet, air-dried for 15 minutes and baked at 140° C. in an oven for 30 minutes.

What is claimed is:

1. A process for the preparation of coprecipitated hybrid pigments consisting of a) diketopyrrolo[3,4-c]pyrrole pigments according to the formula (I)

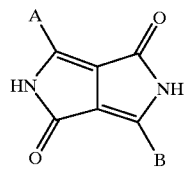

(I)

where A and B are each, independently of the other, a radical of the formula (II)

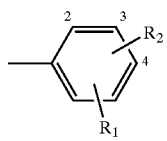
(II)

in which $R_1$ and $R_2$ are each, independently of the other, hydrogen, halogen, $C_1$–$C_5$alkyl, nitrile or phenyl; and b) of pigments bearing —NH, —OH or —CONH— groups, comprising mixing a diketopyrrolo[3,4-c] pyrrole alkali salt suspension with a crude pigment bearing —NH, —OH or —CONH— groups in the presence of an excess of base and precipitating the formed mixture of metal salts together.

2. The process according to claim 1 wherein the proportion of pigments (b) is between 10 and 90% by weight to be reacted with 90 to 10% of diketopyrrolo[3,4-c]pyrrole pigment.

3. The process according to claim 1 wherein the hybrid pigments are co-precipitated from the formed mixture of metal salts by drowning into water or an alcohol or a mixture thereof, in the presence or absence of a mineral or organic acid.

4. The process according to claim 1 wherein the coprecipitated hybrid pigments have a particle size in the range below 1.5 microns.

5. A coprecipitated hybrid pigment prepared according to the process of claim 1 wherein the pigment (b) is selected from the group consisting of anthraquinone, benzimidazolone, naphthol AS, monoazo pigments, disazo pigments, disazo condensation pigments, isoindolinone, dioxazine, benzimidazolone triphenodioxazine, thiazine indigo, perinone, quinophthalone and metal complex pigments.

6. The coprecipitated hybrid pigment according to claim 5 wherein the pigment (b) corresponds to one of the formulae (III), (IV) or (VI) to (XI)

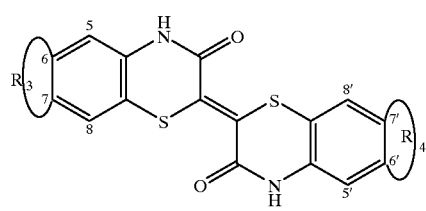
(III)

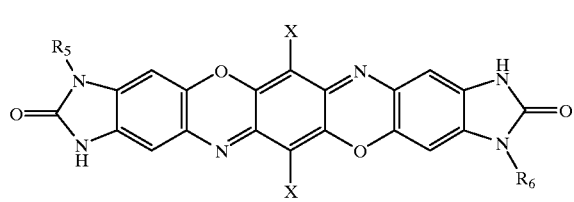
(IV)

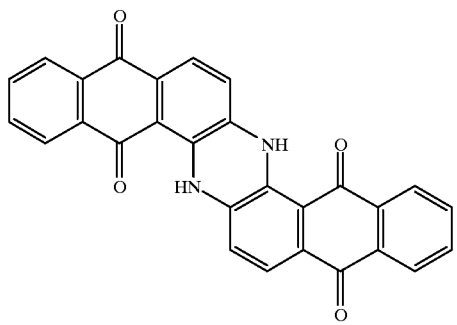
(VI)

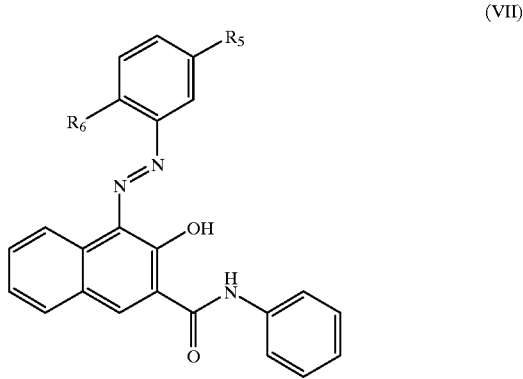
(VII)

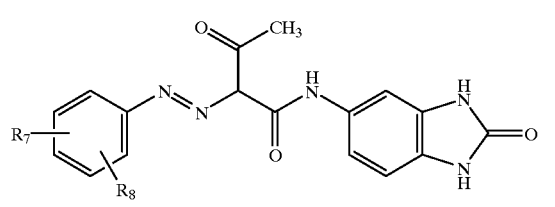
(VIII)

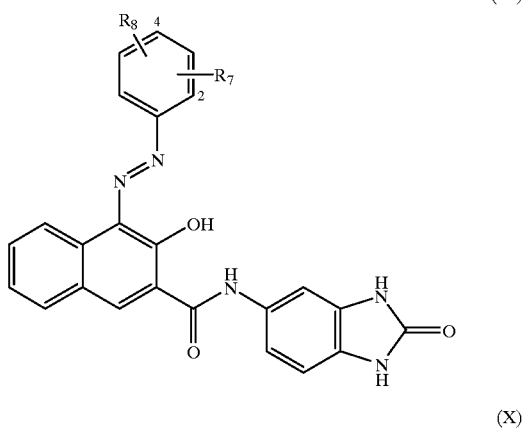
(IX)

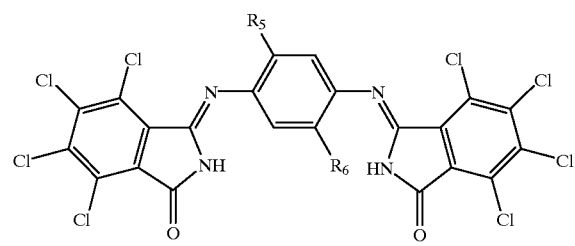
(X)

-continued

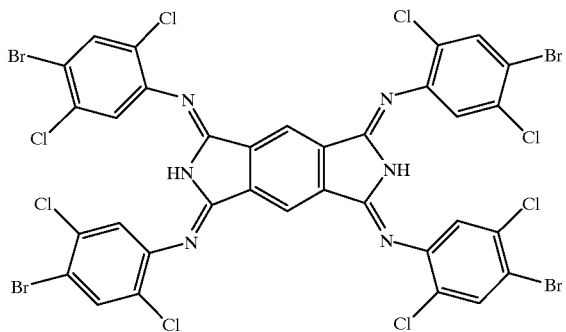

(XI)

in which $R_3$ and $R_4$ are independently the atoms necessary to complete the formation of a substituted or unsubstituted aromatic or aliphatic carbocyclic or heterocyclic ring system; $R_5$ and $R_6$ have the meaning of hydrogen, $C_{1-4}$alkyl or halogen; $R_7$ and $R_8$ have the meaning of $C_{1-4}$alkoxy, nitro, $C_{1-4}$alkoxycarbonyl or phenylaminocarbonyl; and X has the meaning of hydrogen and chloro, provided that in formula (IV) $R_5$ and $R_6$ can also have the meaning of phenyl or substituted phenyl.

7. A printing ink or printed textile comprising a coprecipitated hybrid pigment according to claim 5.

8. A synthetic polymer, synthetic resin or regenerated fiber comprising a coprecipitated hybrid pigment according to claim 5.

9. A method of using a coprecipitated hybrid pigment according to claim 5, comprising adding the coprecipitated hybrid pigment for mass pigmentation to a substrate selected from the group consisting of synthetic polymers, synthetic resins and regenerated fibers.

10. A method of using a coprecipitated hybrid pigment according to claim 5, comprising adding the coprecipitated hybrid pigment as a colorant in a printing ink or textile.

11. A method hybrid pigment according to claim 5, comprising adding the coprecipitated hybrid pigment as a colorant to an electrophotographic toner or developer.

12. A method of hybrid pigment according to claim 5, comprising adding the coprecipitated hybrid as a colorant to a powder or powder coating material.

13. A method of using a coprecipitated hybrid pigment according to claim 5, comprising adding the coprecipitated hybrid pigment as a colorant to an ink-jet ink.

14. A method of using a coprecipitated hybrid pigment according to claim 5, comprising adding the coprecipitated hybrid pigment as a colorant to a cosmetic composition.

* * * * *